United States Patent [19]

Wupper

[11] Patent Number: 4,745,995
[45] Date of Patent: May 24, 1988

[54] SLIP-CONTROLLED BRAKE SYSTEM
[75] Inventor: Hans Wupper, Friedrichsdorf/Ts., Fed. Rep. of Germany
[73] Assignee: Alfred Teves GmbH, Frankfurt am Main, Fed. Rep. of Germany
[21] Appl. No.: 944,652
[22] Filed: Dec. 22, 1986
[30] Foreign Application Priority Data Jan. 2, 1986 [DE] Fed. Rep. of Germany ....... 3602133

[51] Int. Cl.⁴ ................................................. B60T 8/00
[52] U.S. Cl. .......................... 188/181 A; 188/181 R; 303/113; 303/115; 303/117; 303/6.01; 303/24.1
[58] Field of Search ....................... 188/181 R, 181 A; 303/117, 113, 24 R, 24 C, 6 R, 115

[56] References Cited

U.S. PATENT DOCUMENTS

| 4,377,221 | 3/1983 | Farr | 188/181 A |
| 4,602,705 | 7/1986 | Farr et al. | 188/181 A |
| 4,657,120 | 4/1987 | Farr | 188/181 A |

FOREIGN PATENT DOCUMENTS

| 932843 | 9/1955 | Fed. Rep. of Germany. | |
| 1028154 | 4/1958 | Fed. Rep. of Germany. | |
| 1655394 | 9/1970 | Fed. Rep. of Germany. | |
| 807177 | 1/1959 | United Kingdom. | |
| 2027832 | 2/1980 | United Kingdom. | |
| 2029914 | 3/1980 | United Kingdom | 188/181 A |
| 2069642 | 8/1981 | United Kingdom | 188/181 R |
| 2109494 | 6/1983 | United Kingdom. | |
| 2156460 | 10/1985 | United Kingdom. | |

OTHER PUBLICATIONS

W. R. Newton, F. T. Riddy, "Evaluation for Low Cost Anti-Lock Brake System for FWD Passenger Cars".

Primary Examiner—Andres Kashnikow
Assistant Examiner—Mark T. Le
Attorney, Agent, or Firm—James B. Raden; Robert P. Seitter

[57] ABSTRACT

A slip-controlled brake system for automotive vehicles contains a braking pressure modulator (5) operated as a function of the deceleration and having an inert mass (10) which rotates with the vehicle wheel and which, upon a deceleration of the wheel, against resetting forces, is axially displaceable on a shaft (9) rotating with the wheel velocity. A wheel deceleration threshold value being exceeded, a valve member (21) will be actuated and thus the braking pressure will be prevented from increasing further or there even will be a reduction of the braking pressure. The deceleration threshold value is not constant but variable dependence on the braking pressure in the wheel brake (4) of the controlled vehicle wheel. Thereby an adaption of control to the road conditions or rather to the momentary friction coefficient is achieved.

1 Claim, 1 Drawing Sheet

U.S. Patent
May 24, 1988
4,745,995
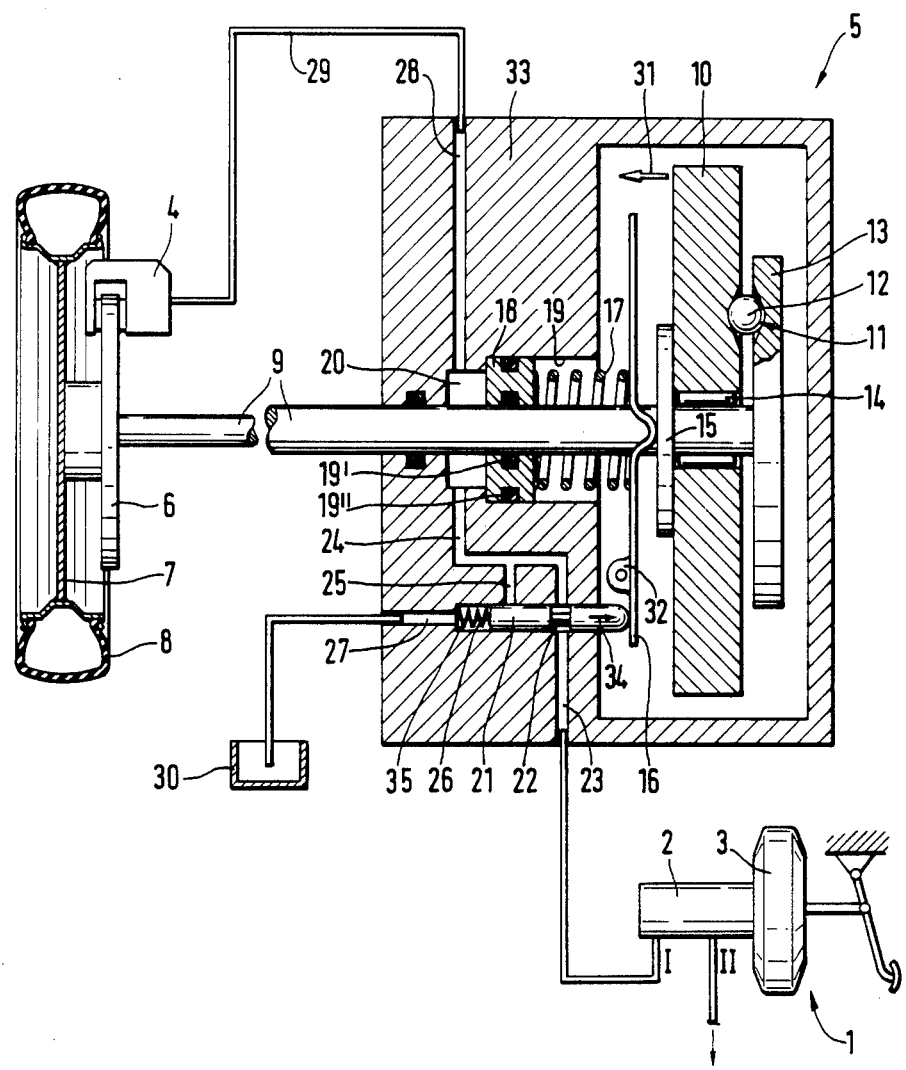

SLIP-CONTROLLED BRAKE SYSTEM

BACKGROUND OF THE INVENTION

This invention relates to a slip-controlled brake system for automotive vehicles which has a braking pressure modulator operated as a function of the deceleration and having an inert mass which is coupled to the slip-controlled wheel. The modulator rotates with the wheel, is axially displaceable against a resetting force upon a deceleration of the wheel, and actuates a valve member after a wheel deceleration threshold has been exceeded, thereby bringing about a modulation of the pressure in the brake of the controlled wheel. The speed of the rotating inert mass corresponds to the speed of the vehicle wheel or to a multiple of the speed.

A control circuit for controlling the braking force of vehicles is known, the circuit having a device measuring the rotating deceleration and having a rotating mass (DE-AS=German Printed and Examined Patent Application No. 16 55 394). By way of a coupling device, the rotating mass is connected with the slip-controlled vehicle wheel by way of a shaft. A wheel deceleration threshold being surpassed, the inert mass at first will maintain its speed due to its inertia. This will result in a speed difference between the shaft and the rotating mass, the mass being axially displaced via a mechanism with a ball and an inclined ramp. By way of a mechanical actuating member, said movement will be transmitted to a variable electrical resistor arranged in a branch of a Wheatstone bridge circuit.

A second resistor in the bridge circuit changes its value proportionally to the braking pressure. If there is a change in the two variable resistor ratio this will result in a detuning of the Wheatstone bridge. Thereby a solenoid valve will be actuated which will modulate the braking pressure of the controlled wheel. Such control circuits are relatively complicated and expensive as they require mechanical as well as electric and electromagnetic components.

For the purpose of slip control already there are also known braking pressure modulators of a purely mechanical type. These modulators contain an arrangement for measuring the rotating deceleration which is similar to the previously described device. In this case, however, by way of mechanical coupling (a lever) the axial displacement of the inert mass, when a wheel deceleration threshold is surpassed, directly leads to the actuation of a valve member bringing about a pressure reduction in the associated controlled wheel and thereby counteracting the lock-up tendency manifest in the high deceleration (SAE Technical Paper Series, No. 840464, Newton, Riddy, Intern. Congress Febr. 27—Mar. 2, 1984). A disadvantage of these modulators consists in that a fixed value is predetermined as a deceleration threshold value which has to lie in the order of magnitude of or even exceeds the maximum vehicular deceleration possible of 1 g, ("g" in this case meaning the constant of acceleration due to gravity). Otherwise, in case of a dry non-skid road surface, the braking pressure would be reduced too early, this leading to an excessive lengthening in the stopping distance as compared with an uncontrolled braking action. Thus, instable behavior of the wheel will be recognized only when the wheel deceleration has amounted to a value above the threshold value of, for example, 1.0 to 1.5 g.

In case of winter road conditions or of aquaplaning, however, the maximum vehicular deceleration possible often lies within the range of only 0.1 to 0.3 g, and thus a wheel deceleration of such magnitude indicating an instability or rather imminent wheel lock-up. Thus, control will start relatively late, namely not until the fixed predetermined deceleration threshold of 1 to 1.5 g is surpassed. The wheel slip then will reveal values which will entail less longitudinal and lateral forces as compared with conditions in case of optimum slip.

This relatively high deceleration threshold further has the disadvantage that in case of cautious brake application on slippery road surfaces, possibly even assisted by high mass moments of inertia of the coupled wheels, drive shafts, and gear rotating masses, the fixed threshold value of 1.0 to 1.5 g will not be reached before lock-up of the wheels. Thus, slip control will not come into operation. Under such circumstances, thus, the deceleration threshold is "run under" as it were.

It is thus an object of this invention to overcome these disadvantages and to further develop a brake system of the type referred to above such as to ensure that even under unfavorable circumstances, such as on slippery road surfaces, control will come about in good time and will recognize instability in each and every case. On the other hand, in case of non-skid road surfaces, the maximum wheel deceleration possible is to be attained without the response of slip control so as to ensure a stopping distance as short as possible.

SUMMARY OF THE INVENTION

It has been found out that this object can be achieved in a surpisingly simple manner by a further development of the brake system which consists in that the resetting force opposite to the axial displacement of the inert mass is variable as a function of the breaking pressure in the wheelbrakes of the controlled vehicle wheel. According to the present invention, thus use is made of the finding that useful information on the road condition or rather on the friction coefficient and a corresponding control variable can be derived from the momentary braking pressure. On a slippery road surface and, thus, in case of low lock-up pressure, in the brake system according to the present invention the wheel deceleration threshold value is low so that slip control will respond as early as in case of a comparatively small deceleration. In the case of a high friction coefficient and of a correspondingly high lock-up pressure, on the contrary, the force opposite to the displacement of the inert mass and, hence, the wheel deceleration threshold value will become relatively high. By means of the present invention therefore, adaption of control to the momentary friction coefficient is achieved and, thus, a considerable improvement in slip control.

According to an advantageous embodiment of the present invention, a return spring and a resetting sleeve, which is directly or indirectly acted upon by the braking pressure in the wheel brake, or a corresponding resetting piston are provided for the generation of the resetting force. Expediently, the return spring has a stop on the side opposite to the inert mass, the stop having the design of a sleeve or of a piston and being displaceable in the direction of the inert mass under the action of the braking pressure of the controlled wheel.

A further advantageous embodiment of this invention consists in that the inert mass is arranged on a shaft rotating with the controlled vehicle wheel with the same velocity or with a multiple of the angular velocity and is coupled with the shaft by way of a mechanism having a ball and an inclined ramp and permitting a speed difference between the shaft and the inert mass upon a deceleration of the wheel and thus bringing about the axial displacement of the inert mass on the shaft or rather relative to the shaft.

Finally, according to another embodiment of this invention it is provided that the displacement of the inert mass be transmissible to the valve member by way of an actuating lever acted upon by the inert mass, on the one hand, and by the return spring, on the other hand. The return spring also could directly rest at the inert mass.

BRIEF DESCRIPTION OF THE DRAWING:

Further characteristics, advantages, and applications of this invention will become evident from the following description of one embodiment of the present invention, reference being made to the accompanying drawing wherein the single FIGURE represents a schematically simplified illustration of a brake arrangement with a brake system according to the present invention.

DETAILED DESCRIPTION:

In the illustrated embodiment a braking pressure modulator 5 is inserted between a braking pressure generator 1, which in this case includes a tandem master cylinder 2 with a booster 3 connected upstream, and a wheel brake 4. Further illustrated are a brake disc 6 acted upon by the wheel brake 4 (a spot-type disc brake) as well as the associated vehicle wheel symbolized by its rim 7 and the tire 8. The braking pressure genertor 1 of this arrangement has two brake circuits I and II hydraulically separated from each other, for example, the wheel brakes of one vehicular diagonal being connected to one of them at a time. However, only the connection of brake circuit I to wheel brake 4 is shown.

The wheel 7, 8 shown or the brake disc 6, respectively, are connected with the braking pressure modulator 5 via a shaft 9 driven directly by the vehicle's wheel or by way of a gearbox, by way of a chain, or the like. Within the modulator 5, the shaft 9 carries an inert mass 10 having the form of a flywheel coupled with the shaft 9 by way of a mechanism 11 which is only generally indicated. The mechanism 11 consists of a ball 12 moving on a surrounding inclined ramp milled or inserted in another manner (in an orbit or a spiral) into the flywheel and/or into the counterpart 13 likewise featuring a disk-like design and seated on the shaft 9. Such mechanisms being known, a detailed illustration has been dispensed with.

The inert mass 10 is guided on the shaft 9 by means of a bearing 14 containing a coupling permitting the rotating mass 10 (the flywheel) to move on and, thus permitting a speed difference between the flywheel and the shaft 9 upon a major deceleration of the shaft 9. A brake (not shown) is built into the mechanism 11 or into the bearing 14. Said brake provides for a predetermined deceleration of the rotating mass 10 in the control phase, i.e., after the axial displacement.

An actuating lever 16 rests against an intermediate disk 15 arranged on the flywheel 10. In the illustrated position, namely in the rest position of the modulator, the actuating lever 16 is held by a return spring 17. In this arrangement, a resetting piston 18 is provided for the support of the spring 17 on the side opposite to respectively the flywheel 10 and the actuating lever 16. The resetting piston 18 is axially displaceably guided on the shaft 9 in a cylindrical bore 19 within the modulator housing 33 and is sealed inside and outside, i.e., relative to the inside wall of the bore 19 and relative to the shaft 9, by means of indicated O-ring 19', 19". In the illustrated rest position, the piston 18 rests at an edge formed by a stepped bore within the modulator housing 33.

Within the modulator 5 or rather within the modulator housing 33, further, an annular chamber 20 is designed which is confined by the shaft 9, by walls within the modulator 5, and by the resetting piston 18. A pressure in this chamber thus will lead to an axial displacement of the piston 18 in the direction of the inert mass 10.

The actuating lever 16 rests at a valve member 21, namely at the piston of a sliding valve. The piston (21) has an annular chamber 22 which, in the illustrated rest position, has a bore 23 communicate with a further bore 24. In the rest position, a second connection 25 to the bore 24 is closed by the piston of the valve member 21. The bore 24 leads to the annular chamber 20, the bore 23 leading outside.

In the illustrated embodiment of the present invention, by way of its flange 32, the lever 16 is supported at the modulator housing 33 so as to be able to turn. Referring to the drawing, under the influence of a helical spring 26 the piston of the control member 21 will be displaced to the right. Thereby, a first, the passage from bore 23 to bore 24 will be closed. Thereupon, a path will be opened with leads from a further bore 27 to connection 25 to bore 24.

Connected to bore 23 is brake circuit I of the braking pressure generator 1. The annular chamber 20 is connected with the wheel brake 4 by way of a bore 28 within the modulator 5 and via a pressure medium line 29. Connected to the bore 24 is a pressure medium compensation or storage reservoir 30. For the sake of simplicity, a pump serving to feed the pressure medium, discharged into the reservoir 30 during the pressure reduction phase, back into the brake system is not illustrated, this type of feedback being known and not belonging to this invention.

The illustrated brake system works as follows. The braking pressure modulator 5 will have no influence on normal, i.e., on uncontrolled braking actions. Brake circuit I is directly communicating with the wheel brake 4 via bores 23, 24, and 28 as well as by way of the pressure medium line 29. As the annular chamber 20 is inserted into the pressure medium circuit, the braking pressure also will act on the front face of the piston 18, the front face confining the annular chamber 20. Thus, the braking pressure also is transmitted to the inert mass 10 and to the mechanism 11 by way of the piston 18, by way of spring 17, the actuating lever 16, and the intermediate disk 15.

The inert mass 10 namely the flywheel, is connected with the shaft 9 by way of the bearing 14 and the mechanism 11. Shaft 9 rotates with the wheel or with the brake disc 6, respectively. The mass 10 and the shaft 9 at first rotate with the same speed. A deceleration of the vehicle wheel and, hence, of the shaft 9 occurring and the deceleration being above a certain threshold value, the mass 10 at first will maintain its rotational velocity due to the rotational energy stored with in the mass 10. There will result a speed difference between the mass 10 and the disk 13 on the shaft 9. Due to the inclined ramp whereon the ball 12 is guided there will come about an axial displacement of flywheel 10 in the direction of the arrow 31, and this against the force of the return spring 17 and of the braking pressure in the annular chamber 20, which braking pressure (by way of piston 18) supports the resetting force of spring 17.

The axial displacement in the direction of arrow 31 causes the lever 16 to turn. Thereby the piston of the valve member 21 will move in the direction of the arrow 34 which at first will lead to an interruption of the pressure medium path from the master cylinder 2 to the wheel brake 4. At first the braking pressure will remain approximately constant. Upon a continuation of the piston movement of the valve member 21 in the direction of arrow 34 then connection 25 will be brought into communication with bore 27, by way of the front chamber 35 of the valve member 21, thus a pressure medium discharge to the compensation reservoir 30 being released. Thus, by way of bore 24, the pressure in the annular chamber 20 is reduced and, hence, also in the wheel brake 4.

The described wheel deceleration was caused by an instabilizing wheel 7, 8 or rather by the occurrence of a lock-up tendency. The braking pressure reduced in the described way now will enable a reacceleration of the vehicle wheel so that the rotating inert mass 10 and the shaft 9 again will adopt the same rotating velocity. The flywheel 10 will be returned into the illustrated position relative to shaft 9 or rather will be moved back axially contrary to the direction of arrow 31. By way of lever 16 and the piston within the valve member 21, this will lead to the termination of the pressure reduction and, finally, to a new release of the pressure medium paths connecting the braking pressure generator 1 with wheel brake 4. The braking pressure in wheel brake 4 thereby will be reincreased to the pressure of the master cylinder 2 of the braking pressure generator 1. By way of a non-illustrated pump system, pressure medium will be fed back from the reservoir 30 into brake circuit I.

In the arrangement in accordance with the present invention, the response factor of modulator 5, which will initiate slip control, or rather the wheel deceleration threshold value thus will vary as a function of the momentary braking pressure. The axial displacement of the inert mass 10 on shaft 9 namely is not only determined by the wheel deceleration but also by the counterforces which, on their part, depend on the resetting piston 18 acted upon by the braking pressure and on the spring 17. In this way, the wheel deceleration threshold value is continuously adapted to the road conditions or rather to the friction coefficient.

What is claimed is:

1. A slip-controlled brake system for an automotive vehicle having vehicle wheels, said system comprising, in combination:

a braking pressure modulator operated as a function of wheel deceleration and having an inert mass which is coupled to a shaft connected to a slip-controlled wheel of the vehicle, said mass rotating with said shaft of said slip-controlled wheel and being axially displaceable against a resetting force upon a deceleration of said slip-controlled wheel, and said mass actuating a valve member after a wheel deceleration threshold has been exceeded, thereby bringing about a modulation of the pressure in the brake of the slip-controlled wheel wherein the resetting force opposite to the axial displacement of said mass (10) is variable as a function of the braking pressure in the wheel brake (4) of the slip-controlled vehicle wheel (7, 8); and wherein a return spring (17) is provided in a cylindrical bore which surrounds said shaft between said slip-controlled wheel and said mass, wherein the end of said cylindrical bore which faces said slip-controlled wheel terminates into a pressure chamber which communicates with and is acted upon by the braking pressure in the wheel brake (4), and wherein a resetting piston (18) is provided in said cylindrical bore between said chamber and said return spring for the generation of the resetting force.

* * * * *